Sept. 4, 1923.

C. SCHALLER

CALCULATING MACHINE

Filed Aug. 10, 1920

1,467,198

9 Sheets-Sheet 1

Inventor
Carl Schaller
By
Attorney

Sept. 4, 1923.

C. SCHALLER 1,467,198

CALCULATING MACHINE

Filed Aug. 10, 1920

9 Sheets-Sheet 3

Inventor
Carl Schaller
By
Attorney

Sept. 4, 1923.

C. SCHALLER

CALCULATING MACHINE

Filed Aug. 10, 1920

9 Sheets-Sheet 4

1,467,198

Inventor
Carl Schaller
By
Attorney

Sept. 4, 1923.
C. SCHALLER
CALCULATING MACHINE
Filed Aug. 10, 1920
1,467,198
9 Sheets-Sheet 5
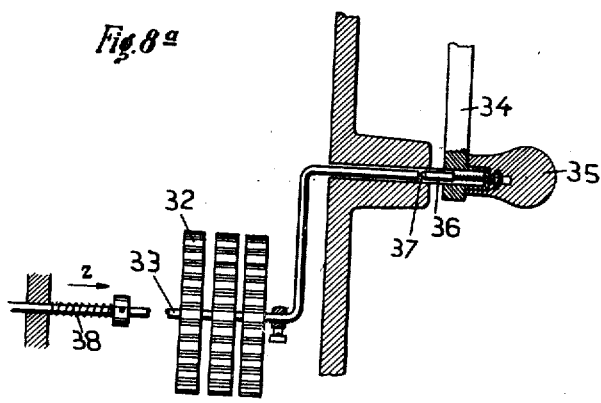
Fig. 8ª
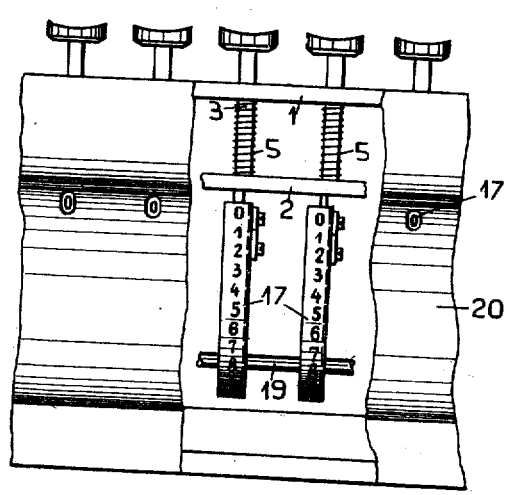
Fig. 7
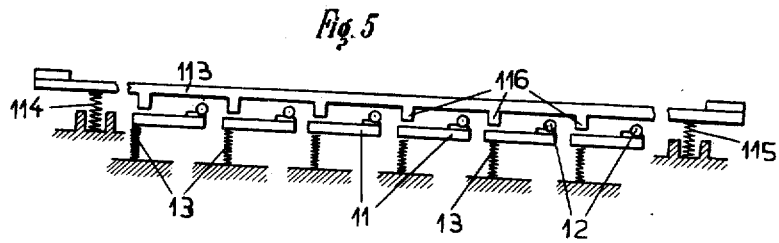
Fig. 5
Inventor
Carl Schaller
By
Attorney Sept. 4, 1923.
C. SCHALLER
1,467,198
CALCULATING MACHINE
Filed Aug. 10, 1920  9 Sheets-Sheet 6
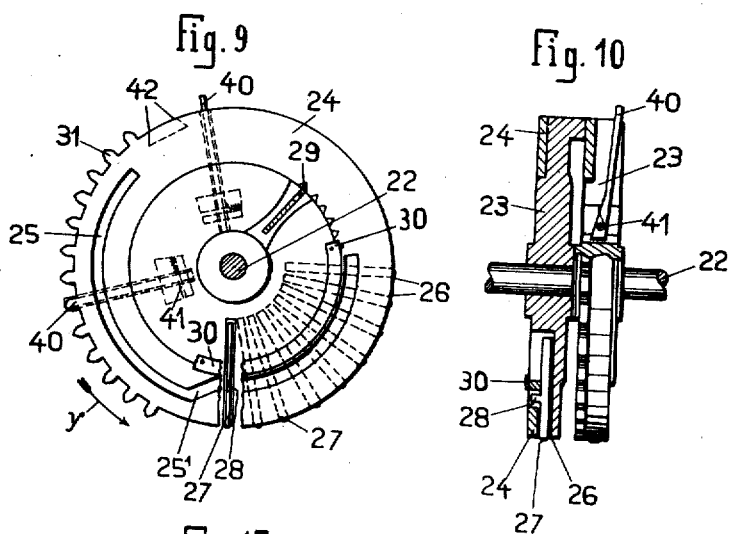
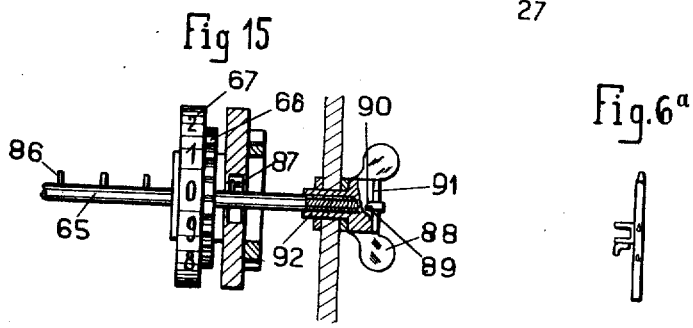
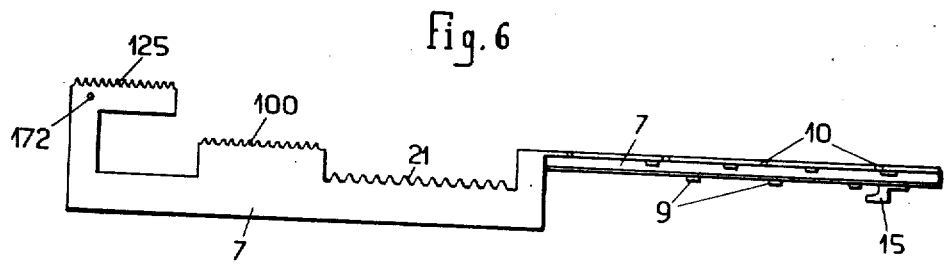
Inventor
Carl Schaller
By
Attorney Sept. 4, 1923.

C. SCHALLER

CALCULATING MACHINE

Filed Aug. 10, 1920

1,467,198

9 Sheets-Sheet 7

Inventor
Carl Schaller
By
Attorney

Sept. 4, 1923.

C. SCHALLER 1,467,198

CALCULATING MACHINE

Filed Aug. 10, 1920

9 Sheets-Sheet 8

Inventor
Carl Schaller
By
Attorney

Sept. 4, 1923.　　　　　C. SCHALLER　　　　　1,467,198
CALCULATING MACHINE
Filed Aug. 10, 1920　　　　9 Sheets-Sheet 9

Inventor
Carl Schaller
By
Attorney

Patented Sept. 4, 1923.

1,467,198

UNITED STATES PATENT OFFICE.

CARL SCHALLER, OF BRUNSWICK, GERMANY, ASSIGNOR TO GRIMME, NATALIS & CO., KOMMANDIT-GESELLSCHAFT AUF AKTIEN, OF BRUNSWICK, GERMANY, A CORPORATION OF THE REPUBLIC OF GERMANY.

CALCULATING MACHINE.

Application filed August 10, 1920. Serial No. 402,735.

*To all whom it may concern:*

Be it known that I, CARL SCHALLER, a citizen of the Republic of Germany, residing at Brunswick, Republic of Germany, have invented certain new and useful Improvements in Calculating Machines (for which applications have been filed in Germany Dec. 19, 1918; Poland, Dec. 31, 1919; Sweden, Dec. 30, 1919; and Czechoslovakia, Dec. 23, 1919), of which the following is a specification.

My invention relates to improvements in calculating machines, and more particularly in calculating machines provided with printing means. And one of the objects of the improvements is to provide a calculating machine of this class in which mechanism is provided in combination with the registering mechanism for taking therefrom the result of a calculation and for transmitting the same to the printing means. With this and other objects in view my invention consists in the matters to be described hereinafter and particularly pointed out in the appended claims.

Figure 3:
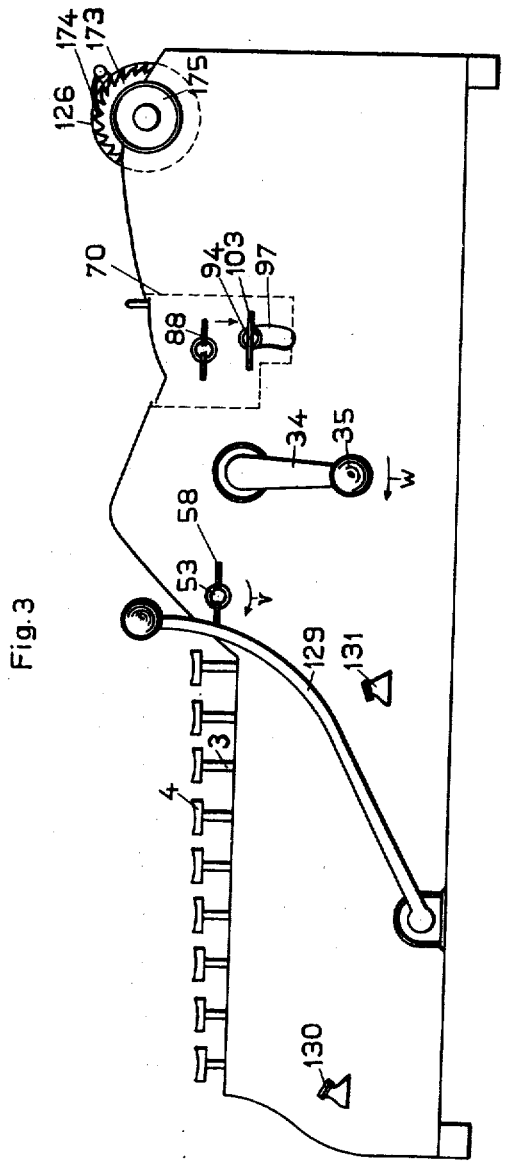
Figure 4:
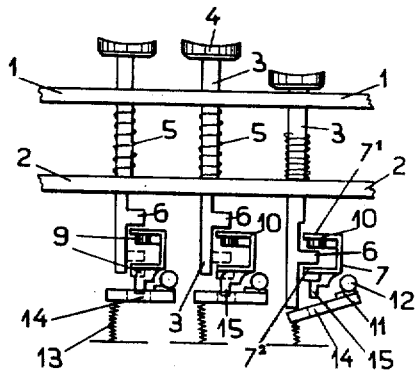
Figure 13:
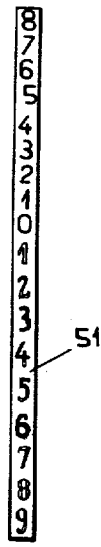
Figure 11:
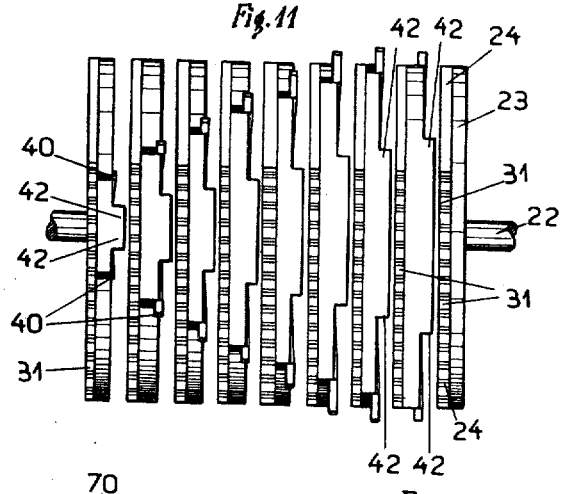
Figure 14:
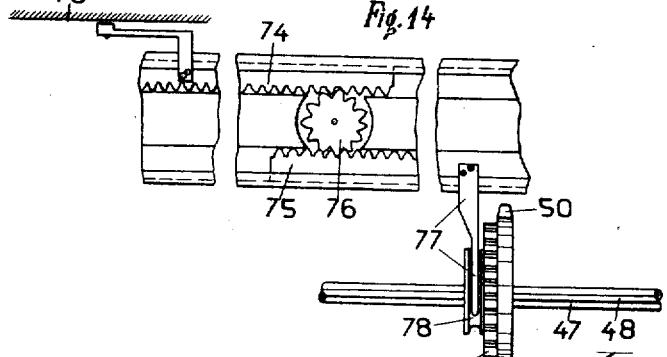
Figure 12:
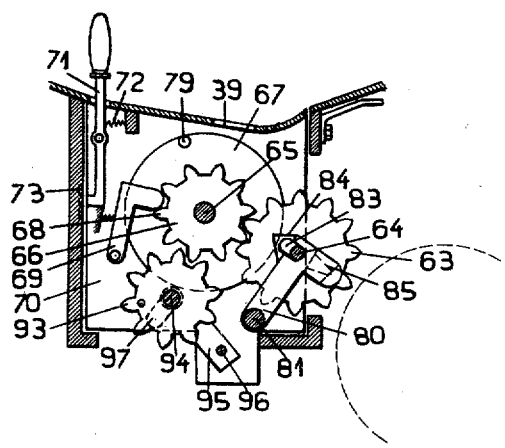
Figure 16:
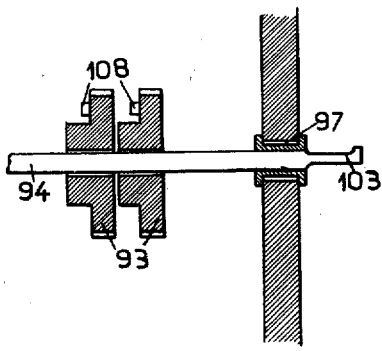
Figure 19:
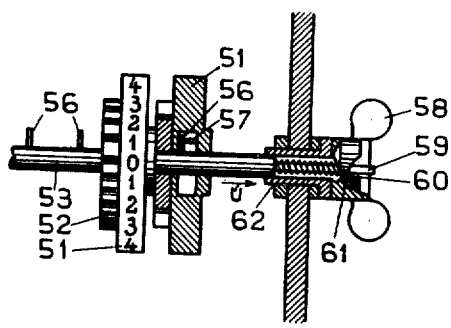
Figure 17:
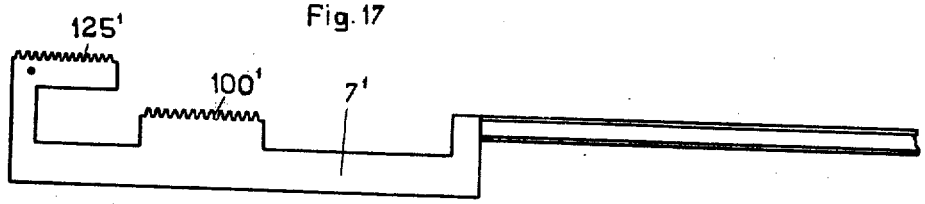
Figure 20:
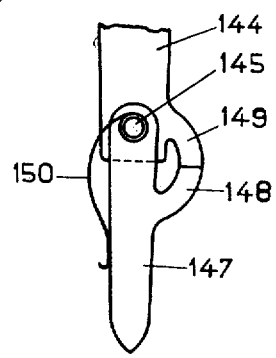
Figure 8:
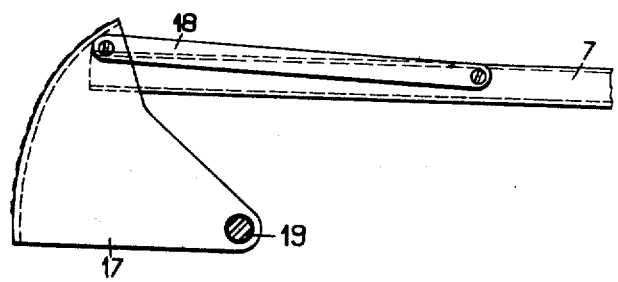
Figure 18:
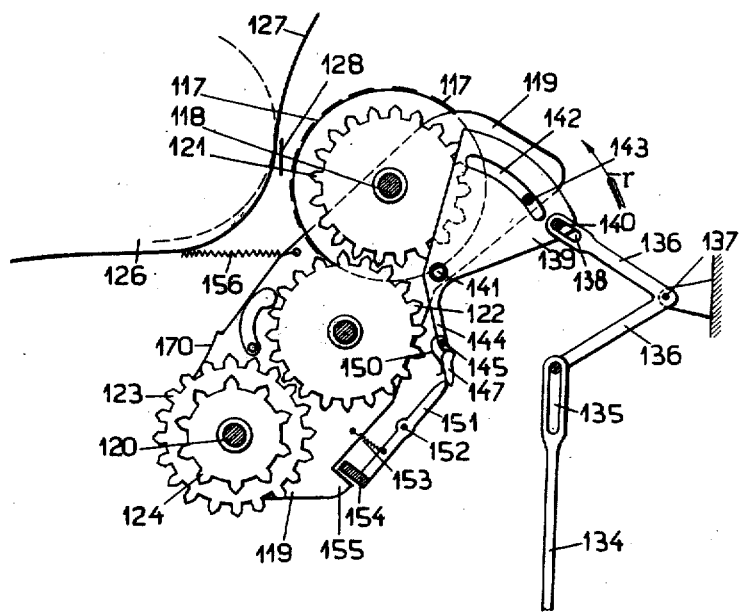

In order that the invention be more clearly understood, an example embodying the same has been shown in the accompanying drawings, in which the same letters of reference have been used in all the views to indicate corresponding parts. In said drawings, Fig. 1, and Figure 1ª comprises a longitudinal section of the machine, Fig. 2, is a plan view thereof with the cover of the casing partly removed, Fig. 3, is a side view of the machine seen from the right, Fig. 4, is a detail view of the key board showing keys, transmission slides controlled by the keys, and means for releasing the slides, Fig. 5, is a detail view showing means for simultaneously releasing all the keys, Fig. 6, is a side view of one of the transmission slides, Fig. 6ª is a front view of the said slide, Fig. 7, is a partial front view of the machine with the wall of the casing partly removed and showing the means for indicating what keys have been depressed, Fig. 8, is a side view of one of the indicating sectors, Fig. 8ª, is a view of the intermediate gear wheels provided between the transmission slides and the calculating mechanism for setting the calculating mechanism, Fig. 9, is a side view of one of the setting disks of the calculating mechanism, Fig. 10, is a cross-section of Fig. 9, Fig. 11, is a front view of the calculating mechanism, Fig. 12, is a cross-section of the registering mechanism and the slide carrying the same and showing in addition a totals wheel, Fig. 13, shows a development of the numeral wheel of the revolutions counting mechanism, Fig. 14, shows the gearing intermediate the shiftable slide carrying the registering mechanism and the single tooth wheel of the revolutions counting mechanism, Fig. 15, is a partial view showing the registering mechanism partly in section, Fig. 16, is a cross-section of some of the totals wheels, Fig. 17, is a side view of a transmission slide which is not operated by keys, Fig. 18, is a side view showing the printing mechanism on an enlarged scale, Fig. 19, is a front view of the revolutions counting mechanism partly in section, and Fig. 20, is a detail view showing a part of the printing mechanism on an enlarged scale.

The keyboard.

Figure 1:
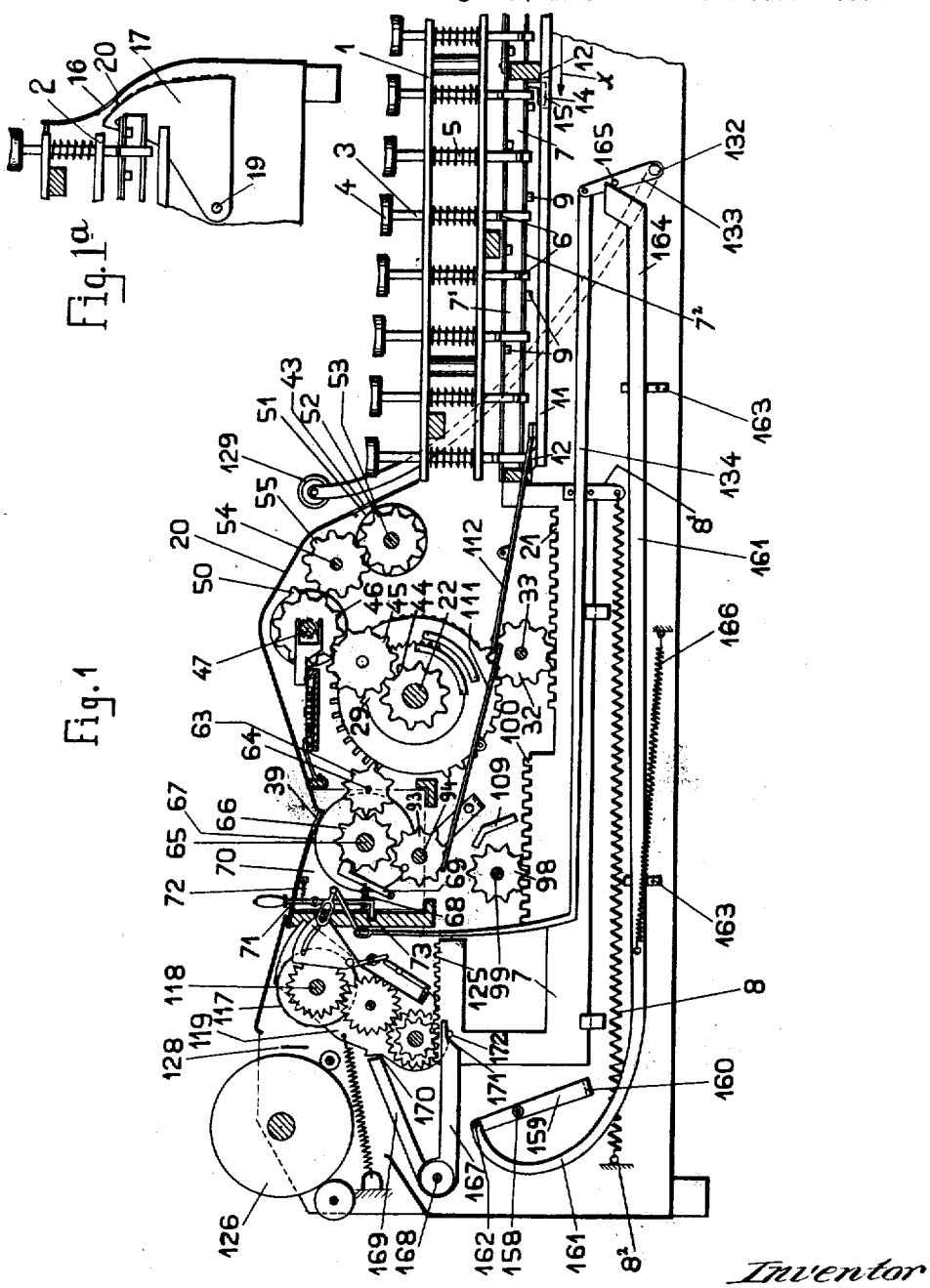
Figure 2:
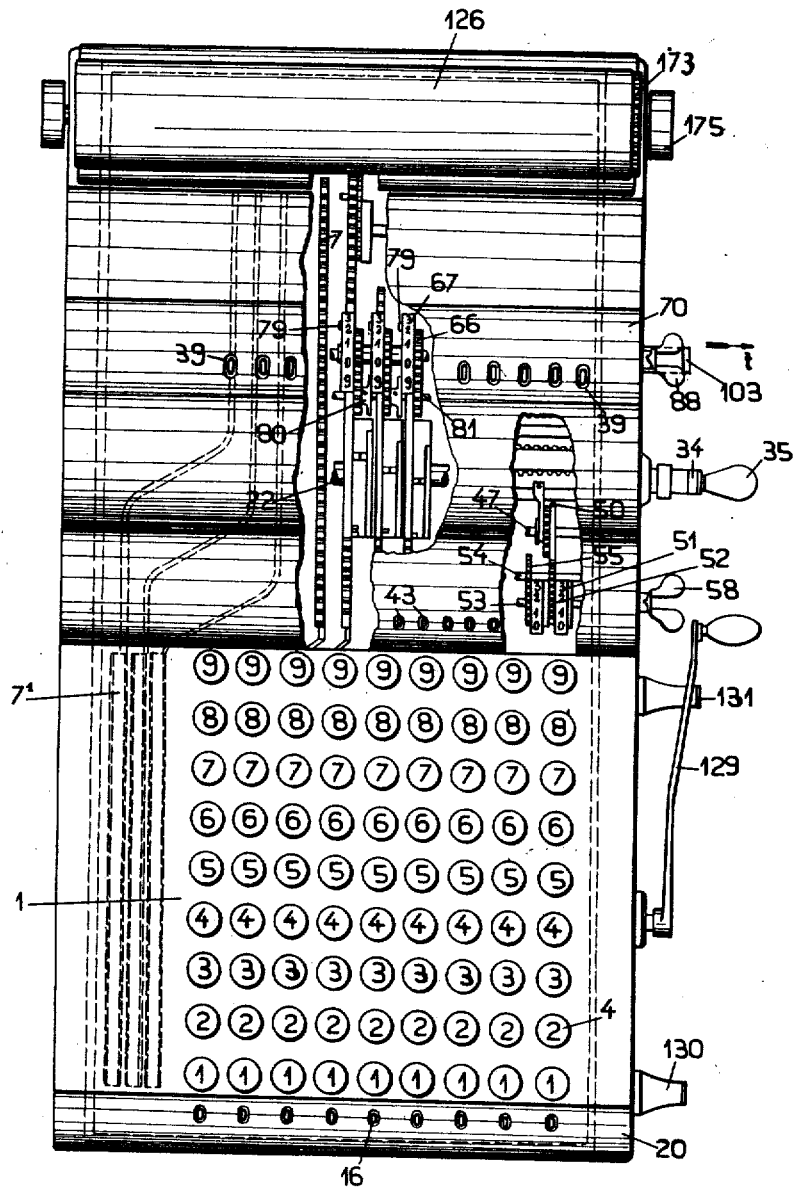

In the example shown in the figures the keyboard comprises an upper and lower plate 1 and 2 providing guides for the stems 3 of keys 4, and the keys are disposed in nine columns located one beside the other and each comprising nine keys representing the numbers from 1 to 9, as is shown in Fig. 2. Corresponding numbers of the keyboard are arranged in transverse rows. By depressing one of the keys the value represented thereby is transmitted to the operative parts of the machine. The keys are acted upon by springs 5 disposed between the plates 1 and 2 which springs bear with their lower ends on the plate 2 and are secured with their upper ends to the stems 3. The stems 3 of the keys 4 project downwards below the plate 2 and they are formed at their lower portions each with a lug 6. Below the lugs 6 of the keys of each column a longitudinal transmission slide 7 is located, and the said slides are acted upon by springs 8 secured at their front ends to downwardly depending arms 8¹ of the slides and with their rear ends to fixed parts 8² and tending to pull the slides rearwards. As appears more particularly from Figs. 4 and 6 the slides consist of vertical webs and upper and lower flanges 7¹ and 7². The flanges 7¹ and 7² are formed with lugs 9, the number of which is in each slide nine. The lugs are in position for engagement each with one of the stems 3 of the cooperating column, and the distances of the lugs from the stems controlling the same correspond to the values of the keys. As shown a part of the lugs 9 is formed on the upper flange and a part on the lower flange of the slide 7. Accordingly the lugs 6 of the stem 3 are disposed different distances away from the lower ends of the stems, so that each lug 6 is in position for cooperation with the proper lug 9. The object of the lugs 6 and 9 is to limit the displacements of the slides 7 according to the values to be transmitted from the keys to the operative parts of the machine. When depressing one of the keys the lug 6 of the said key passes through a slit 10 of the flange of the slide 7 and into the path of a lug 9 provided therefor. Thereafter the key 4 is locked as against movement into initial position by the flange of the slide 7, which has been shifted rearwards by its spring 8, and the said flange locks the key in engagement with the lug 6, until the slide 7 has been returned into initial position, whereupon the lug 6 can move upwards through the slit 10. When depressing a key the lower end of its stem 3 engages a releasing member 11 which normally locks the slide 7 and when rocked downwards by the key permits the slide to be pulled rearwards by its spring 8 in the direction of the arrow x shown in Fig. 1, until one of the lugs 9 strikes on the lug 6 of the depressed key so as to arrest the displacement of the slide 7. As appears from Figs. 1 and 4, the releasing member 11 is in the form of a rocking plate having a support on pivots 12 and acted upon by a spring 13 tending to rock the same upwards. The plate 11 is provided with a hole 14 engaged by a finger 15 depending from the slide so as to lock the same in its forward position. When depressing the rocking plate 11 by means of one of the keys cooperating therewith the finger 15 is released from the hole 14, so that the slide 7 is pulled rearwards and in the direction of the arrow x, until the lugs 6 and 9 are in engagement with each other.

When a number has been set on the keyboard the operator must examine all the rows of keys from 1 to 9 in order to find out what key has been depressed, which can not readily be done. Therefore indicating means are provided at the lower front of the machine. Such means are shown by way of example in Figs. 1, 2, 7, and 8. As shown in the said figures, the cover 20 of the machine which is disposed above the operative parts is formed with peep holes 16, and internally of the machine and at the rear of each peep hole a sector 17 is provided which has the numbers from 0 to 9 printed on the flanged front part thereof. The said sectors have rocking supports on a transverse shaft 19 mounted at the front part of the machine and below the keyboard. Each of the slides 7 is connected by a link 18 with the upper part of the cooperating sector 17. When the slide 7 is in the normal position shown in Fig. 1 the zero sign is displayed through the corresponding peep hole 16, and when depressing one of the keys and permitting the corresponding slide 7 to be shifted in the direction of the arrow x a distance corresponding to the depressed key, the sector 17 is rocked about the shaft 19 to such an extent that the number corresponding to the depressed key is displayed through the peep hole 16, and the said number appears in one of the columns, so that it can easily be ascertained.

*The calculating mechanism.*

The values set by the keys 4 are transmitted to a calculating mechanism by means of rack teeth 21 provided on the rear parts of the slides 7 (Figs. 1 and 6). As appears more particularly from Figs. 9, 10 and 11 the calculating mechanism consists of disks 23 loosely mounted on a shaft 22 and each provided with shiftable teeth 27, and cam rings 24 mounted on the disks 23 and formed with cam slots 25 adapted to be turned on the disks 23. Each of the disks 23 is formed with nine radial slits 26 extending from a part near the axis to the circumference of the disk and providing guides for the teeth 27. The teeth 27 are formed at their sides with noses 28 engaging in the cam slot 25 of the ring 24. With the cam ring 24 in the position shown in Fig. 9 all the teeth are retracted from the circumference of the disk 23, and when turning the cam ring 24 in the direction of the arrow y shown in Fig. 9 the teeth 27 are shifted outwards by means of the noses 28 and the portion 25¹ of the cam slot 25, so that they project a certain distance from the circumference of the disk 23. Therefore the disk 23 has the function of a gear wheel having a variable number of teeth. In order that the cam ring 24 can not be arrested in an intermediate position and with one of the teeth half way projected, it is formed internally with teeth engaged by a spring pressed locking pawl 29 mounted on the disk 23. The cam ring 24 is held as against axial displacement away from the disk 23 by means of a flange 30 secured to the disk 23. The cam ring 24 is formed at its outer circumference with teeth 31 engaging in the teeth of intermediate gear wheels 32, shown in Figs. 1 and 8ª. All the intermediate gear wheels of the calculating mechanism are loosely mounted on a shaft 33 mounted for lateral displacement on fixed parts of the machine. The intermediate gear wheels 32 provide operative connection between the slides 7 and the calculating mechanism. When shifting one of the slides 7 rearwards and in the direction of the arrow $x$ shown in Fig. 1 the cam ring 24 is turned in the direction of the arrow $y$ shown in Fig. 9, so that a number of the teeth 27 corresponding to the value of the depressed key 4 are projected beyond the circumference of the disk 23. Therefore the teeth 27 set in operative position on the disk 23 can be used in the calculating mechanism for performing a calculation. The shaft 22 of the calculating mechanism is provided with a machine crank for operating the same by hand, which crank is turned to the right and in the direction of the arrow $w$ shown in Fig. 3 for performing additions and multiplications, and to the left and in the opposite direction for performing subtractions or divisions. The handle 35 of the crank carries a spring pressed pin 36 (Figure 8ª) adapted for locking engagement with a socket 37 formed in the side wall of the casing of the machine, and in position for locking the crank in its normal position. Before turning the crank the handle 35 is pulled outwards for retracting the spring pressed pin 36 from its socket 37. Before operating the calculating mechanism in the direction of the arrow $y$ or in the opposite direction the slides 7 must first be disconnected therefrom, for which purpose the intermediate gear wheels 32 are shifted laterally. To show what may be done the shaft 33 carrying the wheels 32 is acted upon by a spring 38 (Fig. 8ª) which is adapted to shift the said shaft in the direction of the arrow $z$ when the spring pressed locking pin 36 is retracted from its socket 37 prior to turning the crank, whereby the intermediate gear wheels 32 are shifted out of engagement with the rack teeth 21 and the teeth 31.

When turning the machine crank the teeth 27 which have been set in operative position operate the registering mechanism the numbers of which are displayed through peep holes 39.

The calculating mechanism is provided with carrying means. As shown each of the disks 23 is equipped with laterally rockable carrying teeth 40 having rocking supports on axes 41 and acted upon by springs normally forcing the same towards the adjacent operating disk of lower order. Each of the operating disks 23 carries two rocking teeth 40, and the teeth of the successive disks are displaced from each other so as to be arranged about the calculating mechanism along a spiral, as will be understood from Fig. 11. This construction is provided in order to have a continuous carrying operation through all the places of the registering mechanism when turning the calculating mechanism to the left or to the right. Between adjacent operating disks 23 cam members 42 are located the object of which will be described hereafter.

*The revolutions counting mechanism.*

The revolutions of the machine crank are transmitted through gear wheels 44, 45 and 46 to a shaft 47 provided with a longitudinal groove 48 engaged by a feather of a longitudinally shiftable single tooth wheel 49, as is shown in Figs. 1 and 14. In the cover 20 of the machine casing peep holes 43 are provided and below the same there are numeral disks 51 mounted on a shaft 53 each of which has two series of numbers from 1 to 9 and the zero sign printed about its circumference, the numbers of one of the said series being preferably printed white and the other ones red. The numbers of the series are arranged in opposite order, as will be understood from the development of a numeral disk 51 shown in Fig. 13. The numeral disks have gear wheels 52 carrying 18 teeth secured thereto.

Parallel to the shaft 53 of the numeral disks 51 a shaft 54 is mounted which carries intermediate gear wheels 55. Upon each rotation of the shaft 47 the single tooth 50 acts on one of the intermediate gear wheels 55 and advances the cooperating numeral disk 51 of the revolutions counting mechanism from the "0" to the "1" of the white series of numbers or to the "1" of the red series, according to the direction of the operation of the crank 34. The transmission from the shaft of the calculating mechanism 22 is such that upon rotation of the crank 34 to the right and in the direction of the arrow $w$ shown in Fig. 3 the "1" of the white series of numbers on the numeral disks of the revolutions counting mechanism is displayed, and that upon rotation to the left and in the direction opposite the arrow $w$ the "1" of the red series of numbers is displayed. The single tooth wheel is shifted on the shaft 47 in lateral direction and according to the displacement of the registering mechanism by mechanism shown in Fig. 14, which will be described hereinafter. If at the end of a calculation the revolutions counting mechanism shows a value which must be erased before beginning a new calculation, a resetting mechanism shown in Fig. 19 is operated. As shown in the said figure the shaft 53 is equipped with short pins 56 one for each of the numeral wheels 51, and the numeral wheels are provided each with an internal horizontal pin 57. The shaft 53 is provided at its end with a wing nut 58 formed with a nose 59 engaging in the position shown in Fig. 19 in a cam notch 60 of a hub 61. When turning the wing nut 58 in the direction of the arrow $v$ shown in Fig. 3 the cam 60 shifts the shaft 53 in the direction of the arrow $u$ so far that the pins 56 are in positions for engagement with the pins 57. Therefore, when turning the shaft 53 all the numeral wheels 51 which are not in their zero positions are reset by the pins 57, whereupon the shaft 53 is automatically forced to the left and in a direction opposite to the arrow $u$ by a spring 62, so that the nose 59 gets again in engagement with the cam notch 60, and the pins 56 are disengaged from the pins 57.

*The registering mechanism.*

When turning the crank 34 the teeth 27 which have been set in operative positions mesh with gear wheels 63 mounted on a common shaft 64 parallel to a shaft 65 (Fig. 1). The shaft 65 carries gear wheels 66 provided each with ten teeth and connected with numeral disks 67, as is shown more particularly in Fig. 15. For holding the gear wheels 66 and the numeral disks 67 in the set positions rocking pawls 69 acted upon by springs 68 are provided which engage with their rounded heads in the teeth of the gear wheels 66 so that the numeral disks 67 can not be arrested with their numerals from 0 to 9 in intermediate positions relatively to the peep holes 39. All the numeral disks of the registering mechanism and the intermediate gear wheels 64 are mounted within a separate casing or slide 70 shown in Fig. 12. The slide 70 is mounted for being displaced in a direction parallel to the shaft 22 of the calculating mechanism, as is indicated by the arrow $t$ shown in Fig. 2, so that the teeth 27 of the calculating mechanism can be set in position for cooperation with any places of the registering mechanism. For locking the slide 70 in any of its positions a rocker 71 is provided which is normally pressed by a spring 72 into notches 73 made in the casing of the machine. Before displacing the slide 70 the pawl 71 is rocked by means of a handle formed thereon in releasing position, and after shifting the slide the said pawl locks the same by engaging in the corresponding notch 73. In order that the single tooth 50 of the revolutions counting mechanism registers the revolutions of the crank in the proper place, the slide 70 is operatively connected with the single tooth wheel by two racks 74 and 75 and a gear wheel 76 meshing with the said racks. In order that in addition the single tooth wheel 50 can be turned about its shaft 47, the rack 75 has a bifurcated arm 77 secured thereto which engages in a collar of the hub 78 of the gear wheel 49 connected with the single tooth wheel 50. Therefore, when shifting the slide 70 of the registering mechanism from its units position into its tens position the racks 74 and 75 and the gear wheel 76 shift the single tooth wheel from the units place into the tens place.

The carrying mechanism of the registering mechanism is constructed as follows: Referring more particularly to Figs. 2 and 12, at the side of each numeral disk 67 and at the side opposite to the gear wheels 66 carrying pins 79 are provided, one for each of the numeral disks. When a numeral disk 67 passes from its "9" position to its "0" position the said carrying pin 79 rocks a carrying lever 80 mounted on a shaft 81 and guided on a rod 82 passed through slots 83 of the heads of the levers 80. Upon rotation of the numeral disks 67 the carrying teeth 79 engage cam faces 84 formed on the carrying levers 80, and rock the said levers into positions for engagement with rockable carrying teeth 40 provided on the setting disks 23 so as to rock the said teeth by means of cam faces 85 formed on the rocking lever into operative position relatively to the gear wheels 63 of the next higher order. Therefore the teeth 40 advance the said gear wheels a distance corresponding to one value. Thereby the carrying operation is completed. After each rying operation the carrying levers must be returned into the initial positions shown in Fig. 12, for which purpose cams 42 are provided as is shown in Figs. 4, 9, and 11. It will be understood that carrying must be performed, whether the machine crank is turned to the right or to the left. Therefore the cam faces 84 and 85, and the cams 42 are provided in duplicate on the carrying lever 80 and there are two teeth 40 oppositely arranged on each of the setting disks 23. In order that at the end of a calculation the value displayed through the peep holes 39 can be erased the shaft 65 is provided with pins 86 adapted to cooperate with pins 87 provided internally of the numeral disks 67, the construction and operation being the same as has been described with reference to the corresponding parts of the revolutions counting mechanism. The shaft 65 is provided at its end with a wing nut 88 a lug 89 of which is normally in engagement with a cam notch 90 of the hub 91, and internally of the hub a spring 92 is provided which tends to return the shaft 65 into normal position.

The gear wheels 66 of the registering mechanism are in engagement with gear wheels 93 which are loosely mounted on a common shaft 94 secured to rockers 95 supported on pivots 96 secured to the side walls of the machine casing (Figs. 3, 12, and 16).

As appears more particularly from Figs. 3 and 12, the shaft 94 is adapted to be rocked downwards within a slot 97 provided in the side wall of the machine casing whereby the gear wheels 93 are brought out of engagement with the gear wheels 66 and into engagement with gear wheels 98 mounted on a common shaft 99 and engaging in rack teeth 100 of the slides 7, as is shown in Fig. 6. The gear wheels 93 will hereafter be termed totals wheels. They are adapted to be reset by means of the slides 7 by allowing the springs 8 to pull the said slides from their initial positions into their end positions. As appears from Fig. 16, the shaft 94 is provided at one end with a hand piece 103 and it is shiftable within the curved slot 97. Each of the totals wheels 93 carries at one side a pin 108, and when the said wheels are in engagement with the transmission gear wheels 98, the pins 108 are in positions for striking on stops 109 adapted to arrest the wheels in their zero positions. The transmission gear wheels 98 transmit the movement of the slides 7 to the totals wheels 93, and their object is to transmit the value registered in the registering mechanism 67 to a printing mechanism. As the totals wheels 93 take part in the rotation of the numeral disks 67 of the registering mechanism, the value registered in the registering mechanism is transmitted thereto. If thereafter the totals wheels are rocked downwards and into engagement with the intermediate gear wheels 98, the slides 7 are adapted to rotate the totals wheels 93 through distances corresponding to the values set on the said totals wheels and to move corresponding distances. In order that all the slides 7 can be shifted from their set positions in the direction of the arrow $x$ shown in Fig. 1, means are provided for simultaneously releasing all the plates 11. Such means are controlled by the shaft 94 which when rocking the totals wheels 93 by means of the hand piece 103 acts on two cooperating rocking levers 111 and 112 located at one side of the machine casing and adapted to force a releasing bar 113 downwards which is normally held in elevated position by springs 114 and 115, as is shown in Fig. 5. The releasing bar 113 is formed at its bottom side with lugs 116 bearing on the releasing rockers 11 and adapted when moved downwards to release the slides 7, as will be understood from Fig. 4.

The printing mechanism.

The printing mechanism is disposed at the rear part of the machine, and it is shown in detail in Fig. 18. It comprises type wheels 117 one for each numeral wheel, which carry printing types representing the numbers 1 to 9 and the zero sign. The printing type wheels 117 are rotatable on a shaft 118 mounted at its ends in plates 115 having rocking supports on a shaft 120. Each of the type wheels 117 is connected with a gear wheel 121 operatively connected with intermediate gear wheels 122, 123, and 124. The gear wheels 124 are in mesh with rack teeth 125 of the transmission slide 7 (Fig. 6). Therefore when a value is set by depressing one or more of the keys 4 and thereby shifting the slides 7 accordingly, the value corresponding to the depressed keys is transmitted through the gear wheels 124, 123, 122, and 121 to the type wheels 117, so that the set values can be printed. Furthermore the total or an intermediate result of the calculation transmitted to the registering mechanism 67 can be transmitted to the printing mechanism through the intermediary of the totals wheels 93, the intermediate gear wheels 98 and the slides 7, and it does not matter whether the amount set in the registering mechanism has been obtained by addition and multiplication or by substraction and division, or by any combined calculation. For printing the value set on the type wheels 117 on a sheet of paper 127 a platen 126 of rubber or the like is provided at the rear of the type wheels, and means are provided to feed an inking ribbon 128 between the sheet of paper 127 and the printing types. The ribbon mechanism may be of any known or preferred construction, and it has not been shown in the drawings, because such mechanisms are known in the art. The platen 126 is provided at one end with a ratchet wheel 173 engaged by a pawl 174 whereby rotation of the platen 126 by means of hand wheels 175 is possible in one direction only so that the sheet of paper can be fed only in forward direction. For throwing the types against the platen for printing, means are provided to throw the type wheels in the direction of the arrow $r$ shown in Fig. 18. As shown in Figs. 1 to 3 such means consists of a rocking printing lever 129 located at the side of the calculating machine. The rocking movements of the said lever are arrested by stops 130 and 131. When rocking the printing lever 129 from the position shown in Fig. 3 forwards a shaft 132 carrying the same is rocked accordingly. To the said shaft an arm 133 is keyed to which a link 134 is jointed. The said link is bent upwards at its rear end, and its upper and rear end is provided with a slot 135 engaged by one arm of a bell crank lever 136 having a rocking support on a relatively fixed part 137 of the machine. The second arm of the lever 136 is formed with a slot 138 which is engaged by a rod 140 connecting rocking sectors 139 having rocking support on pivots 141 secured to the rocking plates 119. Near their outer parts the sectors 139 show circular slots 142 which are engaged by pins 143 secured to the rocking plates 119. Each of the sectors 139 is formed with a downwardly projecting arm 144 carrying an elbow link (Fig. 20). The elbow link yields in one direction only and it consists of a pawl 147 having a rocking support on a pivot 145 secured to the arm 144. The pawl 147 and the arm 144 are formed with stops 148 and 149, and at the opposite side a spring 150 is wound on the pivot 146 which tends to hold the pawl 147 with its stop 148 in engagement with the stop 149 of the arm 144. The pawl 147 is engaged by a lever 151 having a rocking support on a pivot 152 and normally held in contact with the pawl 147 by a spring 153. To the lower end of the lever 151 a bar 154 is secured which bears on shoulders 155 of the rocking plates 119 and holds the said plates and the printing mechanism mounted thereon in their end position away from the platen. To the plates 119 tension springs 156 are secured which tend to throw the printing mechanism against the platen. When rocking the printing lever 129 forwards the sector 139 is rocked through the intermediary of the link 134 and the bell crank lever 136, and the sector rocks the lever 151 by means of the pawl 147 into the position in which the bar 154 releases the printing mechanism, which is now thrown by the springs 156 against the platen 126. Upon further movement of the printing lever 129 the pins 143 secured to the plates 119 arrive at the ends of the slots 142, whereby the printing mechanism is retracted from the platen and into the position in which the locking bar 154 is again in locking engagement with the shoulders 155. Finally the pawls 147 pass over the ends of the lever 151 and are retracted into the initial positions shown in Fig. 18 by the springs 150. For printing the transmission slides 7 have been shifted from their initial positions into set positions, either by the keys or by the totals wheels 93. Therefore after printing all the slides 7 must be turned to the positions shown in Fig. 1. This is accomplished upon the return stroke of the printing lever 129. As appears from Fig. 1, at the rear of all the slides 7 a rocker 159 is mounted on pivots 158 secured to the side walls of the calculating machine, which rocker comprises a transverse bar 160 located in position for engagement with the rear ends of the slides 7. To the upper and lateral parts 162 of the rockers 159 a rod 161 is jointed which is guided for longitudinal displacement on suitable guides 163, and which bears with its front face 164 on a pin 165 secured to the arm 133. Therefore, when rocking the printing lever 129 into initial position the pin 165 forces the rod 164 rearwards and in opposition to a spring 166, so that the transverse bar 160 of the rocker 159 forces all the slides 7 forwards and into position for being locked by the plates 11.

In my improved machine means are provided for preventing operation of the printing mechanism by means of the printing lever 129 when no value has been set on the printing mechanism. As is shown in Fig. 1, levers 167 are secured to a common rock shaft 168 located at the rear of the slides 7. To the end of the shaft 168 a locking arm 169 is keyed which is adapted to cooperate with one of the plates 119 of the printing mechanism. The said arm bears on a shoulder 170 so as to prevent printing operation of the printing mechanism. All the levers 167 are formed at their front ends with bevel faces 171, 172 secured one to each slide 7. When transmitting a value to the printing mechanism by means of the slides 7 at least one of the said slides is shifted rearwards so that its pin 172 rocks the rocking arm 169 out of locking engagement with the shoulder 170, so that printing is possible. As long as none of the slides 7 has been shifted the locking arm 169 prevents operation of the printing mechanism.

When shifting the slides 7 into initial positions by means of the rocker 159 the totals wheels 93 engaging in the intermediate gear wheels 98 are rocked into positions corresponding to the values previously transmitted thereby to the slides 7 and the printing mechanism so that they can directly be rocked into engagement with the registering mechanism for taking part in performing another calculation together with the registering mechanism. Therefore I am enabled to calculate and print not only final results but also intermediate results, because such intermediate results are not erased when printing from the totals wheels 93 by the return strokes of the slides 7.

As frequently the results registered in the registering mechanism extend beyond the number of places provided by columns of the keyboard 1, at the side of the key actuated slides 7 additional slides $7^1$ are provided for transmitting values from the registering mechanism to the printing mechanism, and the said slides have the same construction as the slides 7, though they are not acted upon by keys 4. As appears from Fig. 17 the slides $7^1$ are provided only with two racks $100^1$ and $125^1$. The releasing mechanism 11 provided for the slides $7^1$ has the same construction as that provided for the slides 7.

When operating the calculating machine care must be taken that when setting a value only the desired keys 4 are depressed, and by turning the machine crank 34 in one or the other direction an addition, a multiplication, a subtraction, or a division is performed, whereupon, if printing is desired, the totals wheels 93 are rocked and the printing lever 139 is rocked forwards and backwards.

Before starting a new calculation the wing nuts 58 and 88 must be turned for resetting the revolutions counting mechanism and the registering mechanism. The wing nut 88 can be turned only after the totals wheels have been rocked upwards and into positions for engagement with the registering mechanism. Also the values set on the keyboard can be printed by rocking the lever 129 forwards and backwards after depressing the keys.

I claim:

1. In a calculating machine, the combination, with the registering mechanism, the setting mechanism, and the printing mechanism, of operating members adapted to set values on said setting mechanism and connected with the printing mechanism for setting said values thereon, and means to transmit the values set on said registering mechanism to the operating members for transmitting the same to the printing mechanism.

2. In a calculating machine, the combination, with the registering mechanism, the setting mechanism, and the printing mechanism, of slides adapted to set values on said setting mechanism and connected with the printing mechanism for setting said values thereon, and means to transmit the values from said registering mechanism to the said slides for transmitting the same to the printing mechanism.

3. In a calculating machine, the combination, with the registering mechanism, the setting mechanism, and the printing mechanism, of slides adapted to set values on said setting mechanism and connected with the printing mechanism for setting said values thereon, totals members taking part in the registering operation of the registering mechanism for being set from their initial positions to positions corresponding to the values of the registering mechanism, means to operatively connect said totals members with said slides and means to return said totals members when connected with said slides into initial positions and to shift said slides and printing mechanism accordingly.

4. In a calculating machine the combination, with the registering mechanism, the setting mechanism, and the printing mechanism, operating members adapted to set values on said setting mechanism and connected with the printing mechanism for setting said values thereon, totals wheels taking part in the registering operation of the registering mechanism for being set from their initial positions to positions corresponding to the values of the registering mechanism, means to operatively connect said totals wheels with said operating slides, and means to return said totals wheels connected with the operating members into initial positions and to shift said operating members and printing mechanism accordingly.

5. In a calculating machine, the combination, with the registering mechanism, the setting mechanism, and the printing mechanism, of operating members adapted to set values on said setting mechanism and connected with the printing mechanism for setting said values thereon, totals members taking part in the registering operation of the registering mechanism for being set from their initial positions to positions corresponding to the values of the registering mechanism, means to operatively connect said totals members with said operating members, means to return said totals members with the operating members connected therewith into initial positions and to shift said operating members and printing mechanism accordingly, and means adapted to be operated when the operating members are in engagement with said totals members to return the operating members into initial positions and the totals members into their value positions.

In testimony whereof I have affixed my signature in presence of two witnesses.

CARL SCHALLER.

Witnesses:
PAUL HARTUNG,
BERNHARD POMMERT.